(12) United States Patent
Cheung (10) Patent No.: US 6,901,818 B1
(45) Date of Patent: Jun. 7, 2005

(54) TENSION MEASURING DEVICE FOR MOORING LINE

(76) Inventor: Maxwell C. Cheung, 8 Sycamore Creek, Irvine, CA (US) 92612

( * ) Notice: Subject to any disclaimer, the term of this patent is extended or adjusted under 35 U.S.C. 154(b) by 42 days.

(21) Appl. No.: 10/313,087

(22) Filed: Dec. 5, 2002

(51) Int. Cl.⁷ ................................................. G01L 5/04
(52) U.S. Cl. ............................... 73/862.393; 114/230.1
(58) Field of Search ...................... 73/826, 760, 862.05, 73/862.472; 114/230.1–230.3

(56) References Cited

U.S. PATENT DOCUMENTS

| | | | |
|---|---|---|---|
| 2,008,618 A | | 7/1935 | Lefebvre |
| 2,245,039 A | | 6/1941 | Lilija |
| 2,617,294 A | | 11/1952 | Sanders |
| 2,911,823 A | | 11/1959 | Nistico et al. |
| 3,210,994 A | | 10/1965 | Saxl |
| 3,376,740 A | | 4/1968 | Harvey |
| 3,426,589 A | | 2/1969 | Brendel |
| 3,598,999 A | | 8/1971 | Hofmeister |
| 3,618,378 A | | 11/1971 | Shull et al. |
| 3,791,628 A | * | 2/1974 | Burns et al. ................. 254/277 |
| 4,163,126 A | | 7/1979 | Van Mastrigt |
| 4,171,640 A | | 10/1979 | van Mastrigt |
| 4,735,102 A | | 4/1988 | Koenig |
| 5,167,159 A | | 12/1992 | Lucking |
| 5,201,274 A | | 4/1993 | Rinkewich |
| 6,343,515 B1 | | 2/2002 | Dodson |
| 2003/0019970 A1 | * | 1/2003 | Gernhardt et al. .......... 242/534 |

* cited by examiner

Primary Examiner—Edward Lefkowitz
Assistant Examiner—T Miller
(74) Attorney, Agent, or Firm—Knobbe, Martens, Olson & Bear, LLP (57) ABSTRACT

A device for measuring tension in a line for mooring a ship to a dock or an anchor. The device includes three pulleys secured to rigid frames or springs. Sensors are placed on rigid frames, springs or shafts for securing the pulleys. Portions of the mooring line extending from a center pulley to the other two pulleys are approximately perpendicular to portions of line extending from the two pulleys to a winch or a mooring post or hook. The springs between the pulleys may provide resilience in the mooring line which may obviate a need for a pendent line between the mooring line and the winch. The sensors communicate with a signal-processing unit which transmits amplified sensor signals to a monitor which is accessible to personnel aboard the ship. The monitor may display the tension in the mooring line in text or graphic formats.

15 Claims, 7 Drawing Sheets

TENSION MEASURING DEVICE FOR MOORING LINE

BACKGROUND OF THE INVENTION

1. Field of the Invention

The present invention relates to a tension measuring device associated with ship mooring systems, particularly to a tension measuring device mounted on a mooring line for securing a ship to a fixed object such as an anchor, a dock or other structures.

2. Description of the Related Art

Generally, a mooring line extends from a winch of a ship to a fixed object such as an anchor or a dock. In the course of mooring the ship, the mooring line is subject to tension that fluctuates according to the oscillating behavior of the ships and external force exerted by tides, current and winds. Under turbulent wind and tidal conditions, the tension in a line may surge to a degree that may rupture the line.

Once a line is parted, remaining lines are subject to greater tension force in order to compensate for the lost tension in the disconnected line, which may lead to continuous rupturing of other lines. Once all the lines are disconnected, the ship will drift away from its preferred location and cause significant injuries or property losses. To prevent the mooring lines from rupturing, the tension in the mooring lines must be monitored constantly. If tension in one or several mooring lines exceed a certain limit, crew or other personnel aboard the ship will take precautionary or remedial measures, such as adding more lines or cast off and leave the dock.

Figure 1:
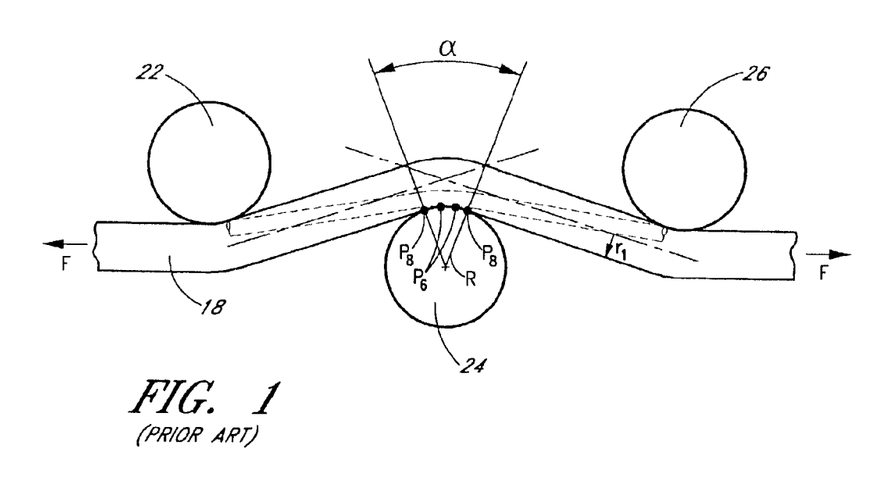
FIG. 1 is a prior art schematic view showing rollers of a tension measuring device and a mooring line passing through the rollers.

Several systems have been suggested to monitor the tension in mooring lines. For example, FIG. 1 illustrates U.S. Pat. No. 4,171,640 to van Mastrigt who employs three rollers 22, 24 and 26 with radius R engaging a rope or cable 18 with unstresssed radius $r_1$. The angle between the two tangent (contact) points, P8 is α. The downward force exerted by the cable to the central pulley 24 is 2F sin $$\frac{a}{2}.$$

This downward force may be measured by a load cell which provides an indication of the tension in the rope. The personnel aboard the ship may monitor the tension in the line by reading a meter associated with the load cell.

Figure 2:
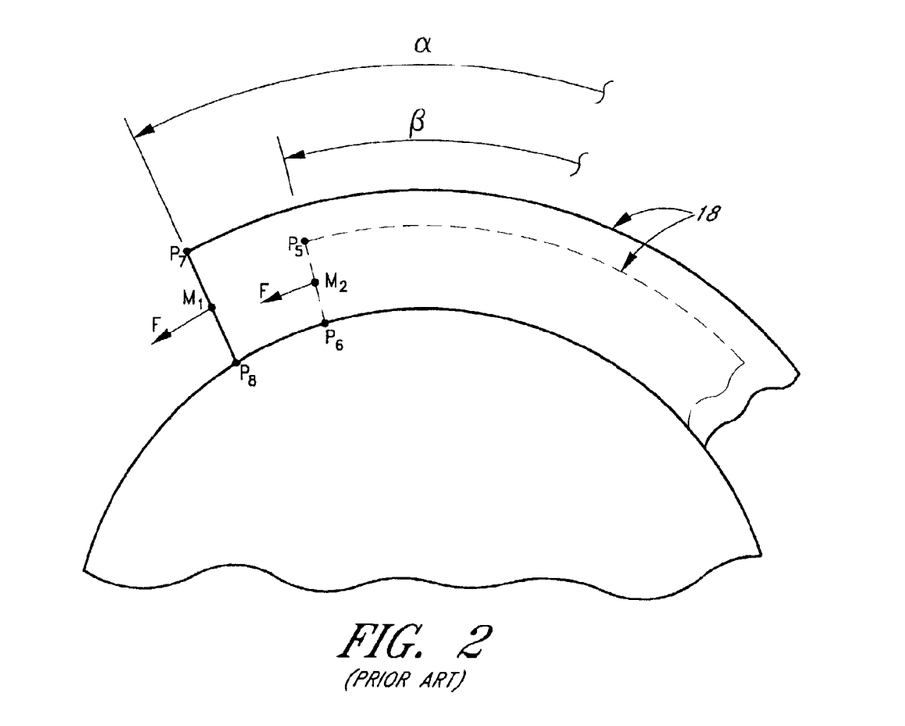
FIG. 2 is a detailed view of a center roller of the tension measuring device of FIG. 1 and the mooring line engaging the center roller.

Such a device, however, may provide inaccurate reading when applied to soft synthetic lines where the cross section changes with level of tension. It is also inaccurate when the mooring line wears out or flattens from prolonged use. When a smaller cable passes through this same arrangement, the angle between the two contact points reduces to β, as illustrated in FIG. 2. The downward force at the central pulley is now 2F sin $$\frac{\beta}{2}.$$

The difference is the error in the system.

FIG. 2 shows the thickness of the cable 18, originally $P_7P_8$, reduced to $P_5P_6$ where the last contact point has shifted to the right to $P_6$ when the line's cross section is smaller. Before the wear, the line 18 has a center of force $M_1$ from which tensile force F would extend along the cable 18 perpendicular to the line $P_7P_8$. Once the line flattens, the center of force would be $M_2$ somewhere between the points $P_5$ and $P_6$, and the tensile force F would not be perpendicular to the line $P_7P_8$, but rather to the line $P_5P_6$.

Another device for measuring tension in a mooring line employs sensors attached to the frame of the winch. Such a device is more complicated, expensive and the readings are indirect.

Still another system for measuring the tension in the line involves measuring the natural frequencies of a vibration in the tensioned line. This system was based on the idea that frequencies tend to increase when the tension in the line was stronger. A continued measurement of the tension, however, was not practical in this system because vibrations need to be excited each time before the tension in the line can be measured. Another problem in this system was that the vibration in the line might be influenced by changes in the unit weight of the line, possibly caused by rain, snow or other matters that may accumulate on the line.

SUMMARY OF THE INVENTION

Embodiments according to the present invention measure tension in a line between a ship and a fixed object and at the same time, eliminate the necessity of pendent lines. The fixed object, among others, may be an anchor, a dock or other natural or artificial fixtures to which the line may be secured.

One embodiment comprises rotatable members, frame elements connecting the rotatable members and at least one sensor for determining tension in the line. The rotatable members may comprise a first pulley, a second pulley and a third pulley. These rotatable members engage the line extending between the ship and the fixed object. The first pulley may engage a portion of the line extending to the ship. The second pulley, on the other hand, may engage a portion of the line extending to the fixed object. The third pulley may be configured to engage a portion of the line between the first and the second pulleys.

Preferably, the portion of the line between the first and the second pulleys is substantially perpendicular to portions of the line extending from the first or the second pulley to the ship or the fixed object.

The frame elements of this embodiment provide connections among the rotatable members. The frame elements may comprise a first frame element connecting the first and the second pulleys, a second frame element connecting the first and the third pulleys and a third frame element connecting the second and the third pulleys. In this embodiment, the line passes through the pulleys so that the frame elements and pulleys hang from the line. All the frame elements can be rigid. Alternately, at least one of the frame elements can be resilient. The resilient frame element may include a spring or multiple springs which may be secured to other frame elements or the pulleys.

Traditionally, the mooring lines are made from "manila rope" material which has a reasonable stretch property. This characteristic is important for shock absorption. As the ships get bigger and the external loads exceed the capability of the manila ropes, steel wires are used. To compensate for the rigid steel material, a short segment of strong synthetic line is added to the front end of the cable and is called the pendent line. The present tension monitor incorporates a spring which can eliminate the necessity of the pendent lines.

The sensor for determining the tension in the line could be placed on various places of the device. For example, the sensor can be embedded on the frame elements or on shafts of the pulleys, in bores for receiving the shafts of the pulleys or between the springs on the frame elements. Various types of sensors may be employed for such purposes. For example, strain gauge, extensometer or load pin can be used.

BRIEF DESCRIPTION OF THE DRAWINGS

These and other features of the invention will now be described with reference to the drawings summarized below. These drawings and the associated description are provided to illustrate preferred embodiments of the invention and are not intended to limit the scope of the invention.

DETAILED DESCRIPTION OF THE PREFERRED EMBODIMENT

Figures 3, 4A, 4B:
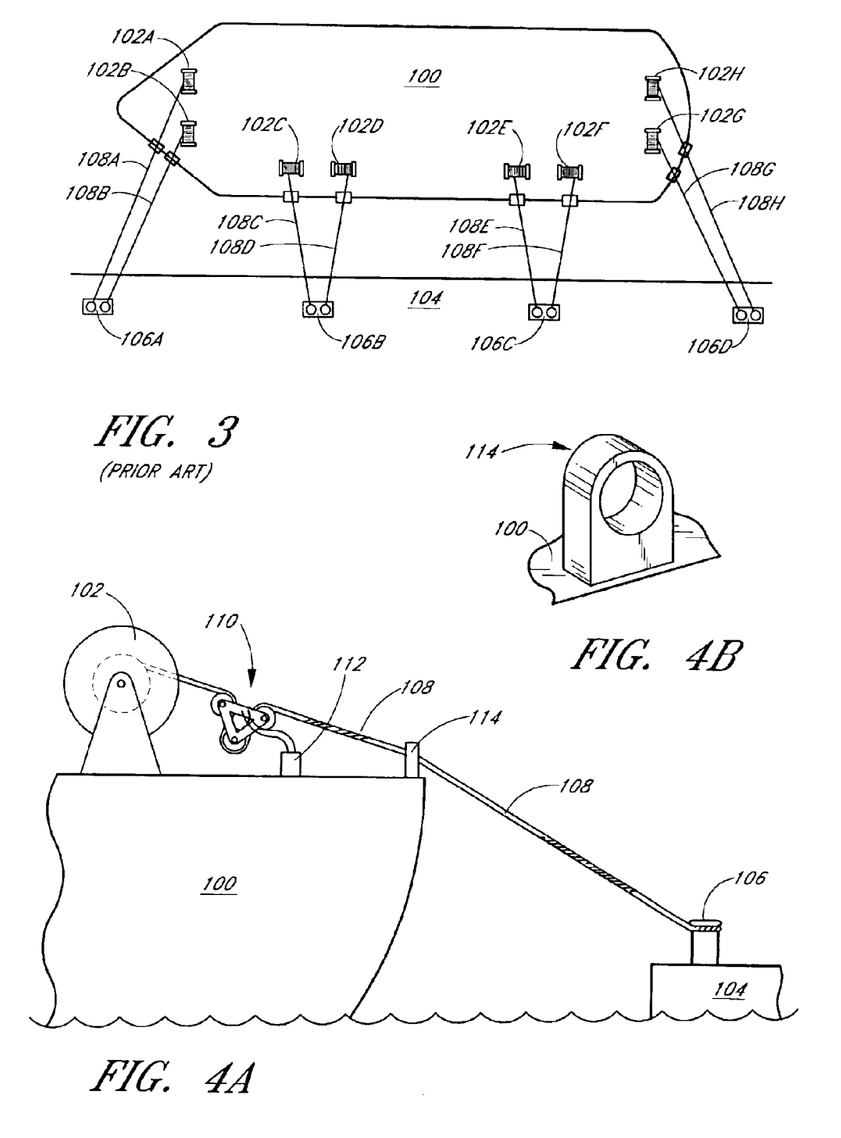
FIG. 3 is a schematic top view of a ship moored to a dock by multiple mooring lines.
FIG. 4A is a schematic view showing a mooring line extending from a winch of a ship and a tension measuring device of the present invention mounted on the mooring line.
FIG. 4B is an enlarged, fragmentary view of the chock shown in FIG. 4A.

FIG. 3 shows an example of a ship 100 moored to a dock 104 by multiple mooring lines 108A–H. The ship 100 is a medium sized ship having multiple winches 102A–H secured onto its deck. The mooring lines 108A–H extend from the winches 102A–H of the ship 100 to mooring hooks or posts 106A–D fixed to the dock 104. The following embodiments, however, are applicable to mooring lines for mooring smaller sized ships having only a single winch and a single mooring line extending from the winch.

The following embodiments may be used in conjunction with mooring hooks such as Smart Hook™ manufactured by Harbour & Marine Engineering Pty Ltd., Melbourne, Australia. Alternately, the embodiments may be used in conjunction with a ship mooring system mounted on the winch as disclosed in U.S. Pat. No. 5,201,274 to Rinkewich incorporated herein as a reference.

The mooring lines in this specification may include any types of wires, cables or ropes capable of sustaining the tension force along its longitudinal direction. The lines may be composed of material such as natural or synthetic fiber material, plastic or metal. The line, at one end, may include a pendent line which provides resilience to the line.

Frame elements in this specification refer to any structure that is capable of securing the pulleys. Such frame elements can include, among others, crossbeams, compression springs, tension springs, rods, frames, shafts, locking pins and screws. The frame elements may include resilient structures and need not be rigid.

FIG. 4 shows a first embodiment of the tension measuring device 110 hanging from a mooring line 108. The mooring line 108 extends from the winch 102 on the ship 100, through a chock 114 and secured to the hook 106 on the dock 104. The first embodiment of the tension measuring device 110 includes a junction box 112 that is placed on or near the deck of the ship 100 in proximity to strain gauges 234 embedded on triangular frames 250, 350, one of which is shown in FIG. 5.

Figure 5:
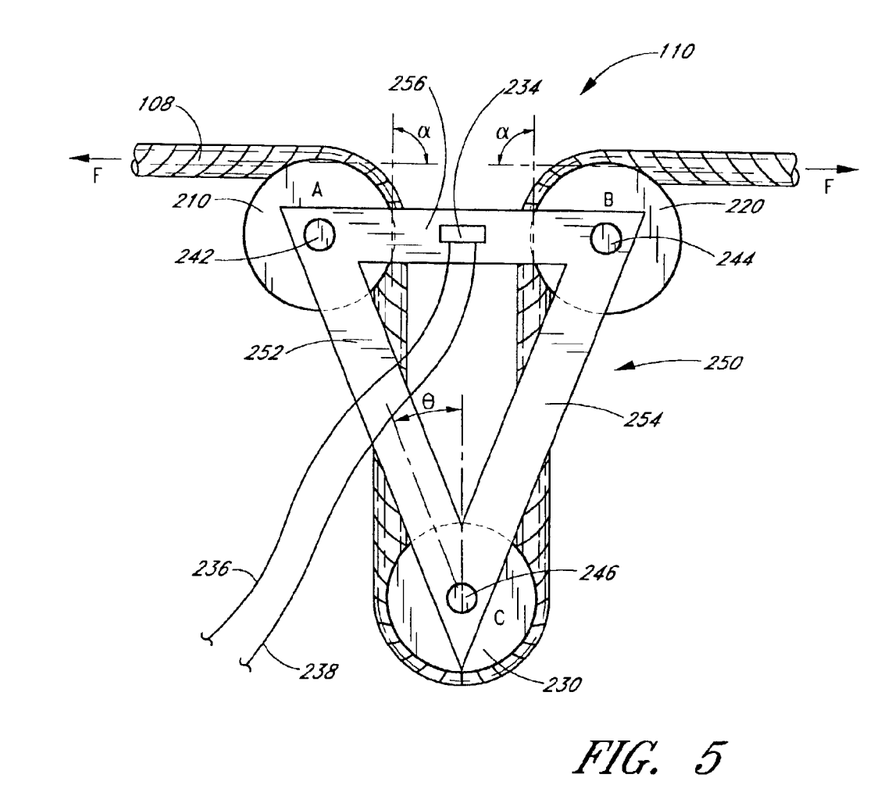
FIG. 5 is a front view of the tension measuring device of FIG. 4A.

Referring to FIG. 5, the first embodiment of the tension measuring device 110 comprises a first pulley 210, a second pulley 220 and a third pulley 230. The pulleys 210, 220, 230 are secured to triangular frames 250, 350 by means of shafts 242, 244, 246 by any suitable method. The front frame 250 comprises a first arm 252, a second arm 254 and a third arm 256. The first pulley 210 is mounted at the apex formed by the arms 252 and 256. The second pulley 220 is mounted at the apex formed by the arms 254 and 256. The third pulley 230 is mounted at the apex formed by the arms 252 and 254. The rear triangular frame 350 also comprises three arms securing the pulleys 210, 220, 230 in a same manner as described above. The mooring line 108 extends from the winch 102 of the ship 100, winds over the first pulley 210, winds below the third pulley 230, and winds over the second pulley 220 and through the chock 114 at the side of the ship before extending to a mooring post or hook 106 fixed onto the dock.

The angle θ in FIG. 5 denotes an angle between the arm 252 and an imaginary vertical line. In this embodiment, the triangular frames 250, 350 are isosceles triangles with arms 252 and 254 being of equal length. F in FIG. 5 denotes tension in the line 108. An angle α denotes the angle of line 108 wrapped around pulleys 210 and 220. Preferably, the radiuses of the pulleys 210, 220, 230 and the distance between these pulleys 210, 220, 230 are configured so that the angle α is 90 degrees, as viewed in FIG. 5. As a result, the portions of the line to and from the pulley 230 are roughly perpendicular to the arm 256 between the pulleys 210 and 220.

Letters A, B, C denote centers of the shafts 242, 244, 246 and pulleys 210, 220, 230. As shown in FIG. 5, the centers A and B of the shafts 242, 244 are located at a same vertical level above the center C of the shaft 246. It can also be stated that the center C displaces the mooring line from a line between the centers A and B more than the diameter of the pulley 230. In this embodiment, a strain gauge 234 is shown on arm 256. Two wires 236 and 238 are used to transmit the stress signal to the rest of the monitoring system as explained later.

Figure 6:
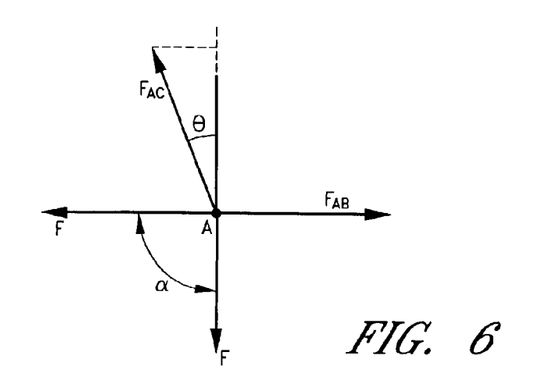
FIG. 6 is a vector diagram showing the relationship between the tension in the mooring line and compressive or tensile force in the arms of triangular frames of the device of FIG. 5.

FIG. 6 is a vector diagram showing the relationships between the tensile force F in the mooring line 108, tension FAB in both of the third arms 256, 356 and tension $F_{AC}$ in both of the first arms 252, 352. From equilibrium of these forces, the following relationships can be derived:

$$F_{AC} = F\frac{\sin\alpha}{\cos\theta}$$

$$F_{AB} = F(1-\cos\alpha+\tan\theta\cdot\sin\alpha)$$

Compared to the tension measuring device of U.S. Pat. No. 4,171,640 to van Mastrigt, changes in the thickness of the mooring line 108 will have negligible effect on the force exerted on the pulleys 210, 220, 230 because portions of mooring line 108 extending vertically will exert same force on the third pulley 230 regardless of the change in the thickness of the mooring line 108 as long as the angle $\alpha$ is maintained close to 90 degrees. Therefore, the first embodiment will provide an accurate measurement of the tension even when the mooring line 108 wears out or flattens.

Figure 7:
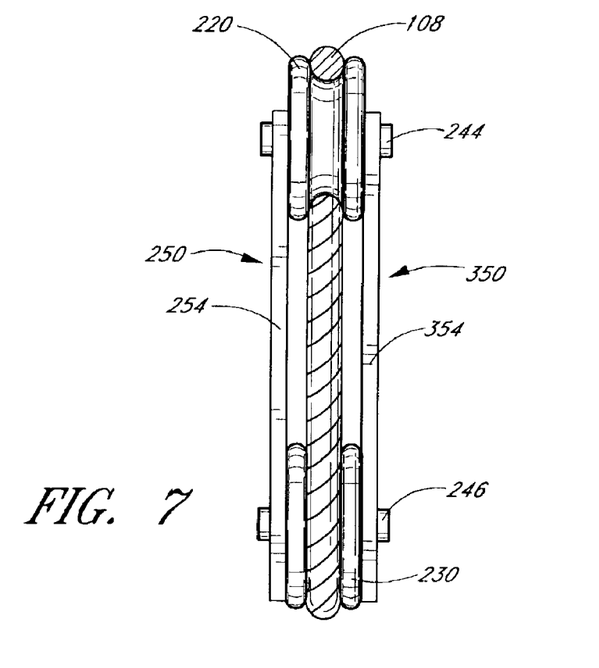
FIG. 7 is a side view of the tension measuring device of FIG. 5.

FIG. 7 is a side view of the first embodiment. Two triangular frames 250, 350 are secured at both sides of the pulleys 210, 220, 230 symmetrically. Bores are formed at apexes of the triangular frame elements 250, 350 to receive the shafts 242, 244, 246. Bearings may be provided in the bores to allow the shafts 242, 244, 246 to rotate smoothly.

Figure 8:
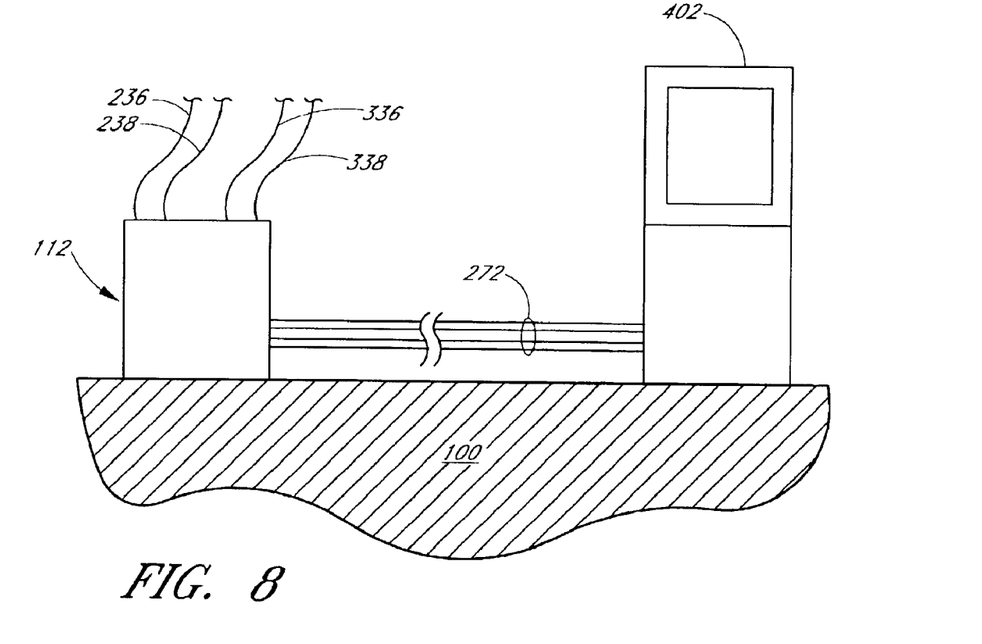
FIG. 8 is a schematic view of a signal-processing unit and a monitor.

FIG. 8 shows the junction box 112 to provide connections between the strain gauges 234 via wires 236, 238, 336, 338 and communicating with a central processing unit (CPU) 402 via a communication line 272. The CPU 402 includes a power source such as a battery to provide the strain gauges 234 with electric currents via the wires 236, 336. The CPU 402 receives sensor signals from the strain gauges 234 via the wires 238, 338 which indicate strains in the arms 256, 356. Receiving the signals from the two strain gauges is advantageous because the tensile force F in the line 108 could be determined more accurately if the frame is bent. Further, using two strain gauges may promote redundancy because even when one strain gauge fails to operate, the remaining strain gauge will provide signals to determine accurate tension force F in the mooring line 108. Though the junction box 112 is separately located on the deck of the ship 100 in the first embodiment, it can be mounted onto the triangular frames instead.

In the preferred embodiment, the CPU 402 is located at the navigation bridge of the ship 100 where the personnel aboard the ship may easily access. The sensor signals from the strain gauges 234 may be too weak to be transmitted over a wire to the CPU 402. In which case amplifiers can be used. Another method of long range transmission is to measure ampere changes instead of voltage changes. Though the first embodiment uses a wire communication to transmit the amplified signals, radio transmission equipment can be placed inside the junction box 112 and wireless signals can be communicated with the CPU 402. Further, the CPU 402 can be configured to receive signals from multiple signal-processing units. The CPU 402 may display overall status of the tension in the mooring lines in text or graphic formats.

Various modifications to the first embodiment can be made. A load pin may be used instead of the strain gauges to measure the tension force F in the mooring line 108. The load pin replaces any one of the shafts 242, 244, 246 and measures the force exerted on the load pin by the pulley. Sensor signals from the load pin may be transmitted to the junction box 112 which may amplify the signal and send it to the CPU 402. The load pins suitable for this purpose are provided by various suppliers such as Transducer Techniques at 43178-T Business Park Drive, B-101, Temecula, California 92590.

Another modification involves changing the number of sensors used. Instead of using two strain gauges as in the first embodiment, just one or more than two strain gauges may be placed on different arms. Alternately, load pins may be used in conjunction with the strain gauges. Preferably, the signal-processing unit 112 is capable of receiving multiple sensor signals from these different sensors and transmit amplified sensor signals to the monitor 402.

Still another modification is changing the number of lines the device could hold. Though the first embodiment holds only one mooring line 108, pulleys 210, 220, 230 may be configured to hold multiple mooring lines. Alternately, more than one pulleys can be mounted on the shafts 242, 244, 246 to hold multiple mooring lines. In such a modification, more than one pulley can be mounted coaxially to a load pin capable of transmitting multiple sensor signals for radial forces exerted on multiple pulleys.

Further modifications may involve locating the assembly of pulleys and the frames over the dock 104 close to the mooring hook or post 106 rather than over the deck of the ship 100. The junction box 112 may be placed on the dock 104 in proximity to the assembly of pulleys and the frames. The CPU 402 may be placed anywhere on the dock 104 to inform personnel on the dock 104 of the tension in the mooring lines 108.

Figure 9:
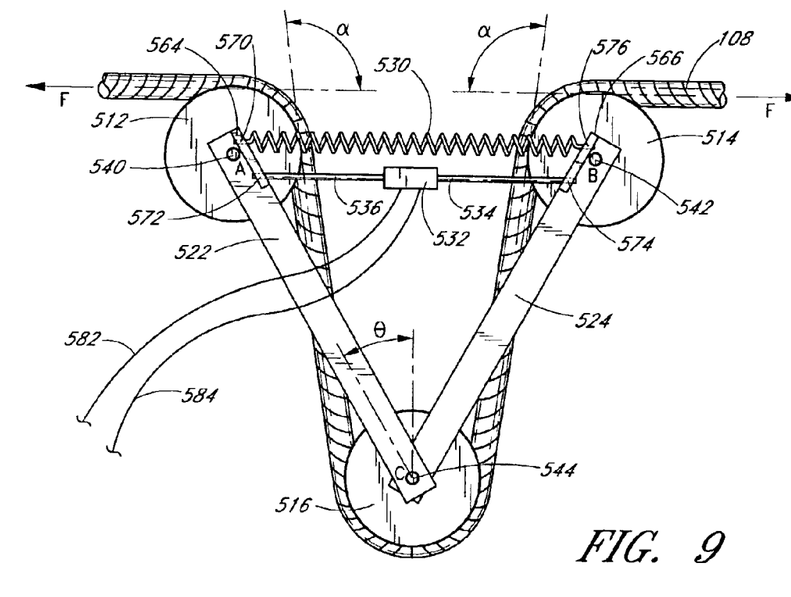
FIG. 9 is a front view of a second embodiment of the tension measuring device with two tension springs between two pulleys.
Figure 10:
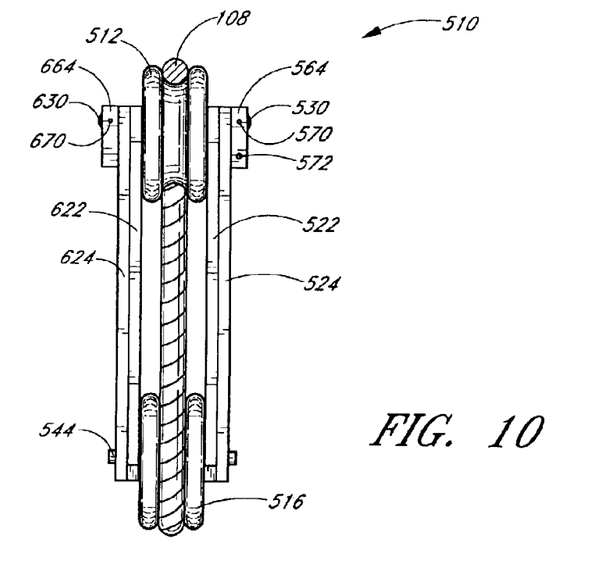
FIG. 10 is a side view of the tension measuring device of FIG. 9.

FIGS. 9 and 10 show a second embodiment of the tension measuring device 510 wherein the third arm of the first embodiment is replaced with a tension spring 530. As seen, a first pulley 512, a second pulley 514 and a third pulley 516 engage a mooring line 108. The first pulley 512 and ends of first rods 522, 622 are mounted on a shaft 540. The second pulley 514 and ends of second rods 524, 624 are mounted on a shaft 542. The third pulley 516 and the other ends of the first and second rods 522, 524, 622, 624 are mounted on a shaft 544. The first and second rods 522, 524, 622, 624 preferably have the same lengths and widths. Thus, with the letters A, B, C in FIG. 9, denoting centers of the shafts 540, 542, 544 and pulleys 512, 514, 516, the centers A and B are located at a same vertical level above the center C of the shaft 544 with the device on the mooring line.

Relationship among the force in the rods 522, 524, 622, 624, the tension springs 530, 630 and the tension force F in the mooring line 108 is same as the first embodiment which is discussed in conjunction with FIG. 6. That is, the tensile force in both of the tension springs 530, 630 can be shown as $F_{AB}=F(1-\cos\alpha+\tan\theta\cdot\sin\alpha)$ and the compressive force in both of the first rods 522, 622 can be shown as $$F_{AC} = F\frac{\sin\alpha}{\cos\theta}.$$

The compressive force $F_{BC}$ in both of the second rods 524, 624 is same as $F_{AC}$ which is $$F\frac{\sin\alpha}{\cos\theta}.$$

The mooring line 108 from the winch 102 passes over the first pulley 512, passes under the third pulley 516, and then passes over the second pulley 514. The angle $\alpha$ is defined as an angle between a portion of the mooring line 108 extending vertically from the third pulley 516 to the first pulley 512 and a portion of line 108 extending from the first pulley 512 to the winch of the ship. This angle is same as an angle between a portion of the line 108 extending from the third pulley 516 to the second pulley 514 and a portion of the line 108 extending from the second pulley 514 to the chock 114 at the side of the ship. Preferably, the angle α is approximately 90 degrees when the tension force F in the line 108 is not excessively great or small. The angles α will tend to increase as the tension force F in the mooring line 108 increases.

The first and second rods 522, 524, 622, 624 each have longitudinal ribs, three of which are shown 564, 566, and 664 integrally formed thereon at the ends of the rods secured to the shafts 540, 542. The ribs start at ends of the rods 522, 524, 622, 624 close to the shafts 540, 542 and extend diagonally downward. Upper holes 570, 576 and lower holes 572, 574 are shown in the ribs 564, 566. The ribs 564, 566, 664, 666 serve as a structure to which ends of tension springs 530, 630 and ends of the extensometer rods 534, 536 can be secured by suitable securing means. As shown, an extensometer is not provided between the rear rods 622, 624. The upper holes 570, 576 of the ribs 564, 566 receive ends of the tension spring 530. The lower holes 572, 574 of the ribs 564, 566 receive ends of extensometer rods 534, 536. The upper holes 570, 576 and the lower holes 572, 574 are separated by sufficient distance so that the extensometer 532 and the tension spring 530 do not interfere with each other.

When tension force F is applied to the mooring line 108, the tension springs 530, 630 stretch in proportion to the magnitude of the tension force F in the mooring line 108. The extensometer rods 534, 536 slide within the extensometer 532. According to the displacements of the extensometer rods 534, 536, the extensometer 532 transmits sensor signals to a signal-processing unit via two wires 582, 584.

The tension springs 530, 630 serve as buffers for relieving excessive tension force F in the line 108, obviating a need for a pendent line typically installed at the end of the line 108 secured to the hook 106. The spring specification, such as spring rates or the number of springs can be adjusted to provide adequate buffering capacity. Though coil springs were used in this embodiment, other types of spring capable of extending along its length, such as elastic bands or air springs can be used instead.

The junction box 112 and CPU 402 employed in the second embodiment is similar to the one used in the first embodiment. It may have different circuitry for processing sensor signals compared to the first embodiment because the sensor signals are transmitted from the extensometer 532 instead of the strain gauges.

Similar to the first embodiment, changes in the thickness of the mooring line 108 will have negligible effect on the force exerted on the pulleys 512, 514, 516 because the change in vertical force component on the third pulley 516 is negligible as long as the angle α is maintained close to 90 degrees. Therefore, the second embodiment will provide an accurate measurement of the tension even when the mooring line 108 wears out or flattens.

Various modifications can be made to the second embodiment. One modification may involve replacing the left rods 522, 622 or right rods 524, 624 with compressive springs and replacing the tension springs 530, 630 with a rigid rod between the shafts 540, 542. In such a modification, the extensometer should be placed along the compressive springs to measure the displacement of the compressive spring. Using compressive springs instead of tension springs may have the benefit of built-in safety feature because the compression springs will not compress beyond a certain limit.

Another modification may involve changing the angle α. The angle α in the second embodiment need not be 90 degrees and can be increased or decreased. Alternately, other modifications similar to the ones in the first embodiment can be made.

FIGS. 11–14 show a third embodiment of a tension measuring device 700 wherein a compressive spring 724 is installed between first and second pulleys 712, 714 secured to a crossbeam 750 by shafts 734, 736. A third pulley 716 is secured to a bracket 720 by a shaft 738. A center rod 752 positioned within the spring 724 extends between the bracket 720 and the crossbeam 750. An extensometer 754 is connected to an end of the center rod 752. The other end of the center rod 752 is secured to a center part of the crossbeam 750 by a nut 728. Any other securing means, such as adhesives or locking pins can be used in place of the nut 728. A first receiving plate 730 is placed between the bracket 720 and the compression spring 724. A second receiving plate 732 is placed between the crossbeam 750 and the compression spring 724.

Figure 11:
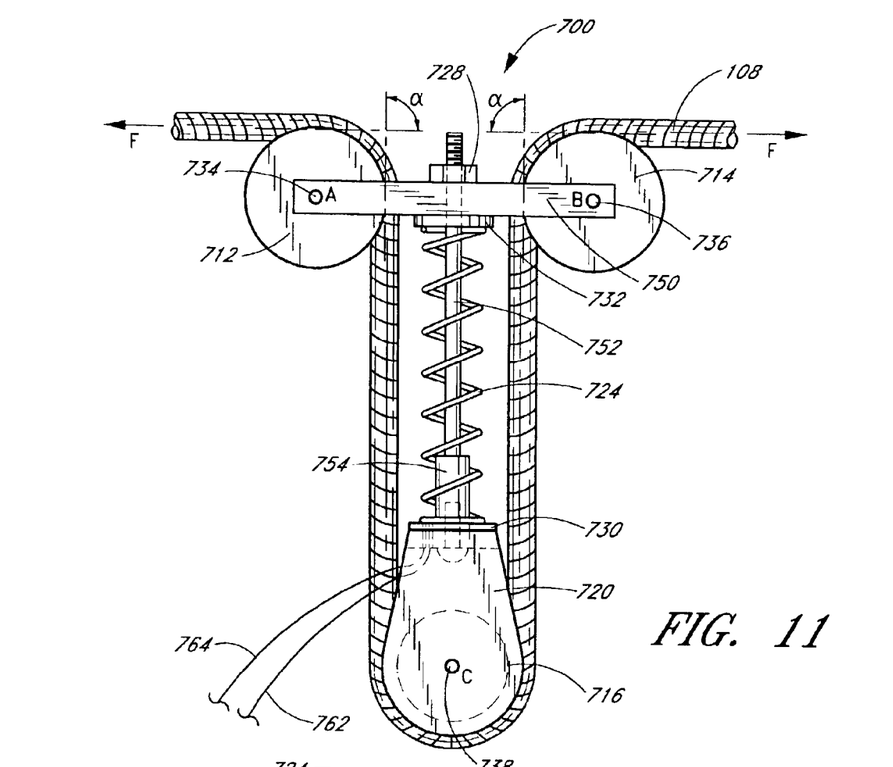
FIG. 11 is a front view of a third embodiment of a tension measuring device with a compression spring between a crossbeam and a bracket holding a pulley.

Letters A, B, C in FIG. 11 denote centers of the shafts 734, 736, 738 and pulleys 712, 714, 716. The centers A and B of the shafts 734, 736 are located at a same vertical level above the center C of the shaft 738 with the device on the mooring line.

The displacement of the compression spring 724 is measured by the extensometer 754. As the spring 724 compresses, the distance between the two receiving plates 730, 732 decreases. The center rod 752 slides within the extensometer 754 which provides sensor signals to a signal-processing unit via wires 762, 764.

Figure 12:
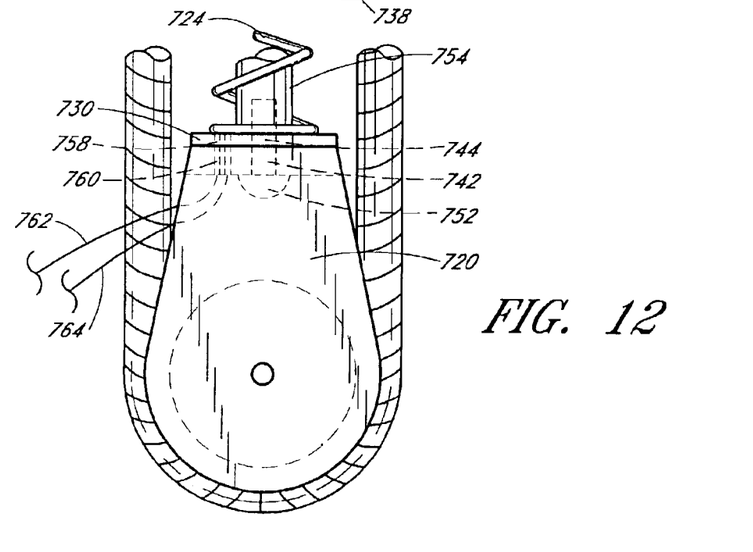
FIG. 12 is a detail view of a portion of the device of FIG. 11.

As shown in FIG. 12, the extensometer 754 is secured to the first receiving plate 730 and the bracket 720 by a screw 752 extending through a hole 742 formed through an upper wall of the bracket 720 and through a hole 744 in the receiving plate 730.

Another set of holes 758, 760 are provided in the bracket 720 and the first receiving plate 730 for the wires 762, 764 extending from the extensometer 754 to the junction box.

A mooring line 108 from the winch 102 passes over the first pulley 712, under the third pulley 716 and passes over the second pulley 714 before extending to the mooring post or hook 106. The angle α is defined as an angle between a portion of line 108 extending vertically from the third pulley 716 to the first pulley 712 and a portion of the line 108 extending from the first pulley 712 to the winch. This angle is the same as an angle between a portion of the line 108 extending from the third pulley 716 to the second pulley 714 and a portion of the line 108 extending from the second pulley 714 to the chock at the side of the ship. Preferably, the angle α is 90 degrees.

The compressive spring 724 serves as a buffer to release dynamic shock load in tensile force F in the line 108, obviating a need for a pendent line typically installed at the end of the line 108 secured to the hook 106. Though only one compressive spring 724 was shown in the third embodiment, more than one compressive spring can be installed between the bracket 720 and the crossbeam 750. These springs can all have different spring rates and total lengths. As the longest spring compresses, other shorter springs can come in contact with the receiving plates 730, 732 and provide additional spring force between the bracket 720 and the crossbeam 750.

Figure 13:
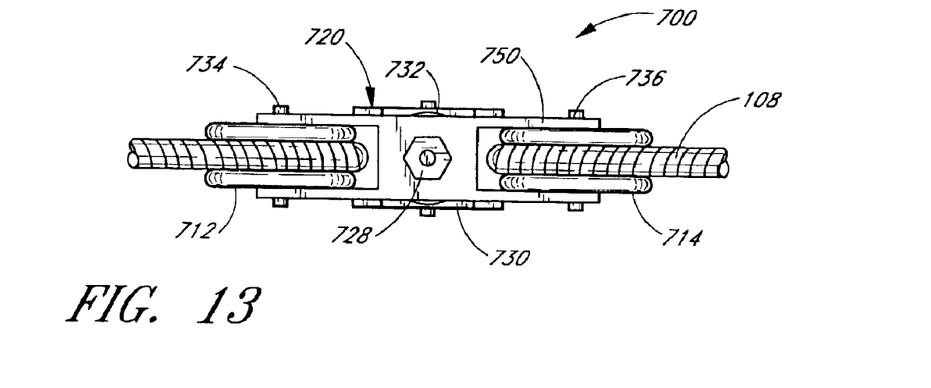
FIG. 13 is a top view of the tension measuring device of FIG. 11.

FIG. 13 is the top view of FIG. 11. The receiving plates 730, 732 are in circular shapes adequate to transmit the compressive force of the spring 724 to the crossbeam 750 and the bracket 720. The receiving plates 730, 732 are formed of metal with sufficient strength to sustain the compressive force exerted by the compressive spring 724.

The device 700 has a built-in fail safe feature. If the compressive spring ruptures, the device will collapse into its shortest length without losing its load carrying capability. The tension spring 530 in the second embodiment may lose elasticity or rupture when the spring 530 stretches excessively because of excessive tension in the mooring line 108. In contrast, the compressive spring 724 is unlikely to suffer any damages even when the tension in the mooring line 108 is excessive because the compression spring 724 will not compress beyond a certain limit.

The compressive force in the spring is twice the tension force F in the mooring line 108. Thus, the tension force F can be determined by dividing the measured compressive force of the spring 724 by two. The tensile force in the crossbeam 750 will be the same as the tension force F in the mooring line 108.

An angle α in FIG. 11 is defined as an angle between a portion of line 108 extending from the third pulley 716 to the first pulley 712 and a portion of line 108 extending from the first pulley 712 to the winch of the ship. This angle is same as an angle between a portion of line 108 extending from the third pulley 716 to the second pulley 714 and a portion of line 108 extending from the second pulley 714 to the chock at the side of the ship. A feature of the third embodiment is that the angle α is not subject to change even when the tension in the mooring line 108 changes significantly as long as the sizes of the pulleys 712, 714, 716 and the distance between the pulleys 712, 714, 716 are configured so that the angle α is initially 90 degrees. Therefore, the extensometer 754 will be able to provide an accurate measurement of the tension force F despite the change in the vertical displacement of the third pulley 716.

Furthermore, changes in the thickness of the line 108 does not affect the force in the compressive spring 724, the crossbeam 750 and the force exerted on the shafts 734, 736, 738 by the pulleys 712, 714, 716 because the angle α is 90 degrees. Therefore, the third embodiment will provide an accurate measurement of the tension even when the mooring line 108 wears out or flattens.

The junction box 112 of the third embodiment will be identical to the one in the second embodiment. The sensor signals from the extensometer 754 will be transmitted to the junction box 112 on the deck of the ship 100 via the wires 762, 764.

Figure 14:
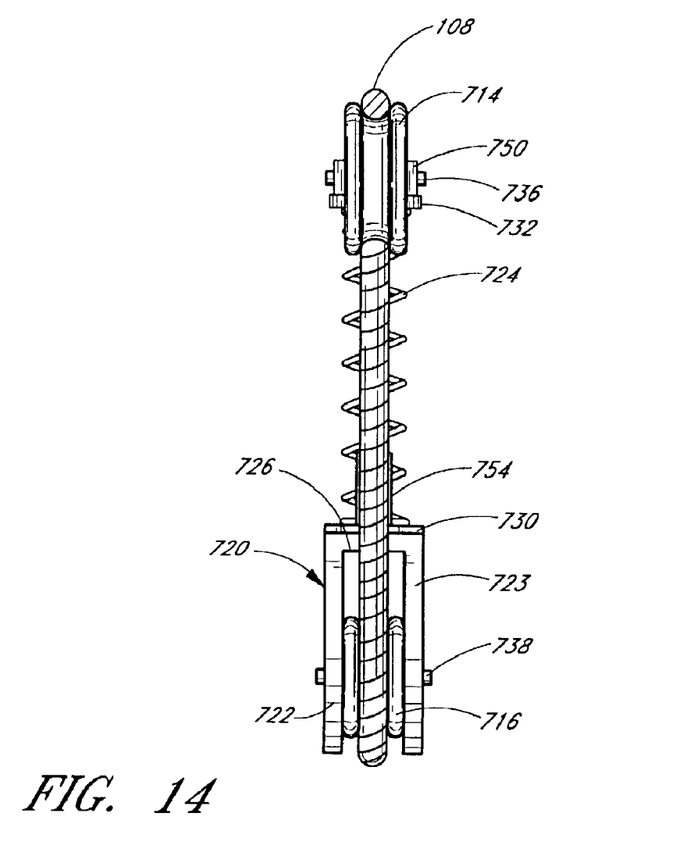
FIG. 14 is a side view of the tension measuring device of FIG. 11.

As shown in FIG. 14, the crossbeam 750 secures both sides of the first and second pulleys 712, 714. The bracket 720 comprises a front plate 722, a rear plate 723 and the upper wall 726 connecting both plates 722, 723. Space is provided between the front and rear plates 722, 723 to hold the third pulley 716. The plates 722, 723 and the wall 726 are formed integrally of metal with sufficient strength to sustain the stress caused by the mooring line 108.

Various modifications to the third embodiment can be made. For example, instead of using the extensometer 754, sensors such as load pins can replace any one of the shafts 734, 736, 738 to measure the radial force between the pulleys 716 and the bracket 720 or between the pulleys 712, 714 and the crossbeam 750. Alternately, a strain gauge may be placed on the spring 724 or the crossbeam 750 to measure the stress or strain in these members. As discussed above, the tension force F in the mooring lines 108 will be same as the tension force in the crossbeam 750.

Another modification can involve providing a switch between the first and second receiving plates 730, 732 configured to activate when the distance between the plates decreases to a predetermined point. The switch may activate an alarm so that a person aboard the ship may take remedial or precautionary measures such as readjusting the tension in the line or escaping the ship to prevent injuries.

Still another modification to the third embodiment may involve changing the angle α. The angle α in the third embodiment need not be 90 degrees and can be increased or decreased. Alternately, other modifications similar to the ones in the first embodiment can be made to the third embodiment.

What is claimed is:

1. An apparatus for measuring and buffering tension in a line for mooring a ship comprising:
   a first pulley engaging a portion of the line extending from a winch of the ship;
   a second pulley engaging a portion of the line extending toward a mooring location;
   a third pulley engaging a portion of the line between the first and the second pulleys;
   a first rod extending between the first pulley and the third pulley;
   a second rod extending between the second pulley and the third pulley;
   a spring connected to the first and the second pulleys; and
   a sensor connected to at least one of the spring or said rods for directly determining strains in said rods or the spring.

2. The apparatus of claim 1, wherein ends of the rods are secured onto shafts extending from the pulleys in a rotatable manner.

3. The apparatus of claim 2, wherein the rods comprise ribs to which ends of the spring can be secured.

4. The apparatus of claim 2, wherein the sensor is embedded onto one of the shafts onto which the ends of the rods are secured.

5. The apparatus of claim 3, wherein the sensor is an extensometer, ends of which are secured to the respective ribs of the rods.

6. An apparatus for measuring and buffering tension in a line for mooring a ship, the apparatus comprising:
   a first pulley engaging a first portion of the line, the first portion extending from a winch of the ship to the first pulley, the first portion defining a first axial direction;
   a second pulley engaging a second portion of the line, the second portion extending from the second pulley toward a mooring location, the second portion defining a second axial direction;
   a crossbeam connecting the first and the second pulleys;
   a third pulley engaging a third portion of the line, the third portion extending between the first and the second pulleys, the third portion defining a third axial direction that extends between the first and the third pulleys and a fourth axial direction that extends between the second and the third pulleys, the third and fourth axial directions being generally normal to the first and second axial directions;
   at least one spring placed between the third pulley and the crossbeam, displacements of said spring changing in response to the tension in the line; and
   a sensor for determining the tension in the line.

7. The apparatus of claim 6, wherein the sensor is embedded in the crossbeam.

8. The apparatus of claim 6, wherein the sensor is embedded in a shaft connecting a pulley to the crossbeam.

9. The apparatus of claim 6, wherein the sensor is an extensometer measuring the displacements of the spring.

10. The apparatus of claim 6, wherein the third pulley is secured to a bracket at one end of the spring.

11. An apparatus for measuring and buffering in a line for mooring a ship, the apparatus comprising:
- a first pulley engaging a first portion of the line, the first portion extending from a winch of the ship to the first pulley;
- a second pulley engaging a second portion of the line, the second portion extending from the second pulley toward a mooring location;
- a crossbeam connecting the first and the second pulleys;
- a third pulley engaging a third portion of the line, the third portion extending between the first and the second pulleys;
- an imaginary plane being positioned between the first, second and third pulleys the imaginary plane extending generally parallel to a plane that extends through an axis of rotation of each of the first and second pulleys, the imaginary plane extending tangentially to an outer circumference of each of the first and second pulleys and the third pulley not being intersected by the imaginary plane;
- at least one spring placed between the third pulley and the crossbeam, displacements of said spring changing in response to the tension in the line; and
- a sensor for determining the tension in the line.

12. The apparatus of claim 11, wherein the sensor is embedded in the crossbeam.

13. The apparatus of claim 11, wherein the sensor is embedded in a shaft connecting a pulley to the crossbeam.

14. The apparatus of claim 11, wherein the sensor is an extensometer measuring the displacements of the spring.

15. The apparatus of claim 11, wherein the third pulley is secured to a bracket at one end of the spring.

* * * * *

UNITED STATES PATENT AND TRADEMARK OFFICE
CERTIFICATE OF CORRECTION

PATENT NO. : 6,901,818 B1
DATED : June 7, 2005
INVENTOR(S) : Maxwell C. Cheung

It is certified that error appears in the above-identified patent and that said Letters Patent is hereby corrected as shown below:

<u>Title page,</u>
Item [56], References Cited, U.S. PATENT DOCUMENTS, delete "Lilija" and insert -- Lilja --.

<u>Column 11,</u>
Line 1, after "buffering" insert -- tension --.
Line 15, after "pulleys" insert -- , --.

Signed and Sealed this

Second Day of May, 2006

JON W. DUDAS
*Director of the United States Patent and Trademark Office*